United States Patent
Kaewka et al.

(10) Patent No.: US 11,875,011 B1
(45) Date of Patent: Jan. 16, 2024

(54) METHOD AND SYSTEM TO PROVIDE INTERACTIVITY FOR EMBEDDED CONTENT

(71) Applicant: YAHOO ASSETS LLC, Dulles, VA (US)

(72) Inventors: Thanawat Kaewka, San Jose, CA (US); Lu Wang, Sunnyvale, CA (US); Liu Munchen, Toronto (CA); Gautham Krishna, Brampton (CA)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/820,989

(22) Filed: Aug. 19, 2022

(51) Int. Cl.
*G06F 3/0481* (2022.01)
*H04L 51/18* (2022.01)

(52) U.S. Cl.
CPC ............ *G06F 3/0481* (2013.01); *H04L 51/18* (2013.01)

(58) Field of Classification Search
CPC ................................ G06F 3/0481; H04L 51/18
See application file for complete search history.

(56) References Cited

U.S. PATENT DOCUMENTS

| | | | |
|---|---|---|---|
| 11,308,228 B1* | 4/2022 | Tian | G06Q 20/1235 |
| 2017/0093779 A1* | 3/2017 | Taliaferro | H04L 51/18 |
| 2018/0253215 A1* | 9/2018 | Powell | H04L 51/18 |
| 2022/0109651 A1* | 4/2022 | Leigh | G06F 3/0481 |
| 2022/0321509 A1* | 10/2022 | Desserrey | H04L 51/046 |
| 2023/0038691 A1* | 2/2023 | Walia | G06F 40/30 |

* cited by examiner

*Primary Examiner* — Mong-Shune Chung
(74) *Attorney, Agent, or Firm* — James J. DeCarlo; Greenberg Traurig, LLP

(57) ABSTRACT

In some aspects, the techniques described herein relate to a method including: receiving, at a processor, a message sent by a sender to a user, the message including a message content item related to an item of interactive content; displaying, by the processor, the message to the user through a user interface (UI); receiving, by the processor, an input corresponding to an interaction between the user and the message content item in the UI, the input directing the processor to generate the interactive content; obtaining, by the processor, interactive content data related to the interactive content; generating, by the processor, the interactive content based on the interactive content data; and displaying, by the processor, the generated interactive content to the user through the UI.

17 Claims, 6 Drawing Sheets

METHOD AND SYSTEM TO PROVIDE INTERACTIVITY FOR EMBEDDED CONTENT

BACKGROUND

Traditional messaging services (e.g., email, instant messaging, social media) allow for the exchange of messaging content for display on user devices. These services do not allow for enhanced interactions between the user and the content. Typically, for example, messages with targeted content inciting a user to try a new mobile application or game are limited to clickable links that takes the user to another page or service (e.g., Apple app store or Google play store) for the user to download the application or game. These additional steps create friction and discourage users from interacting with the content leading to diminished engagement with the service and, by extension, revenue.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The disclosure solves these and other problems in the art of computerized messaging systems by providing by enabling the generation and display of interactive content within a message display interface (MDI) presented to a user. In the embodiments, upon interaction of a user with a message containing targeted content, the MDI can obtain interactive content data and generate interactive content based on the interactive content data. In the embodiments, a user can interact with the interactive content data within the MDI.

In some aspects, the techniques described herein relate to a method including: receiving, at a processor, a message sent by a sender to a user, the message including a message content item related to an item of interactive content; displaying, by the processor, the message to the user through a user interface (UI); receiving, by the processor, an input corresponding to an interaction between the user and the message content item in the UI, the input directing the processor to generate the interactive content; obtaining, by the processor, interactive content data related to the interactive content; generating, by the processor, the interactive content based on the interactive content data; and displaying, by the processor, the generated interactive content to the user through the UI.

In some aspects, the techniques described herein relate to a method, wherein receiving a message from a sender to a user includes receiving an email including a content item and wherein the content item includes a hyperlink.

In some aspects, the techniques described herein relate to a method, wherein obtaining interactive content data related to the interactive content and wherein the interactive content data includes WebAssembly (WASM) instructions.

In some aspects, the techniques described herein relate to a method, wherein an interactive content is generated and the interactive content is a modified version of a mobile application. In some aspects, the mobile application has a related application content data in a first language, wherein the interactive content data of the interactive content is in a second language, and wherein the interactive content data is generated by modifying the application content data.

In some aspects, the techniques described herein relate to a method, wherein interactive content is displayed to a user through a user interface (UI). In some aspects, the UI is a web browser.

In some aspects, the techniques described herein relate to a method, wherein obtaining interactive content data includes obtaining the interactive content data from a third party.

Various details regarding the aforementioned embodiments are described herein.

Figure 1A:
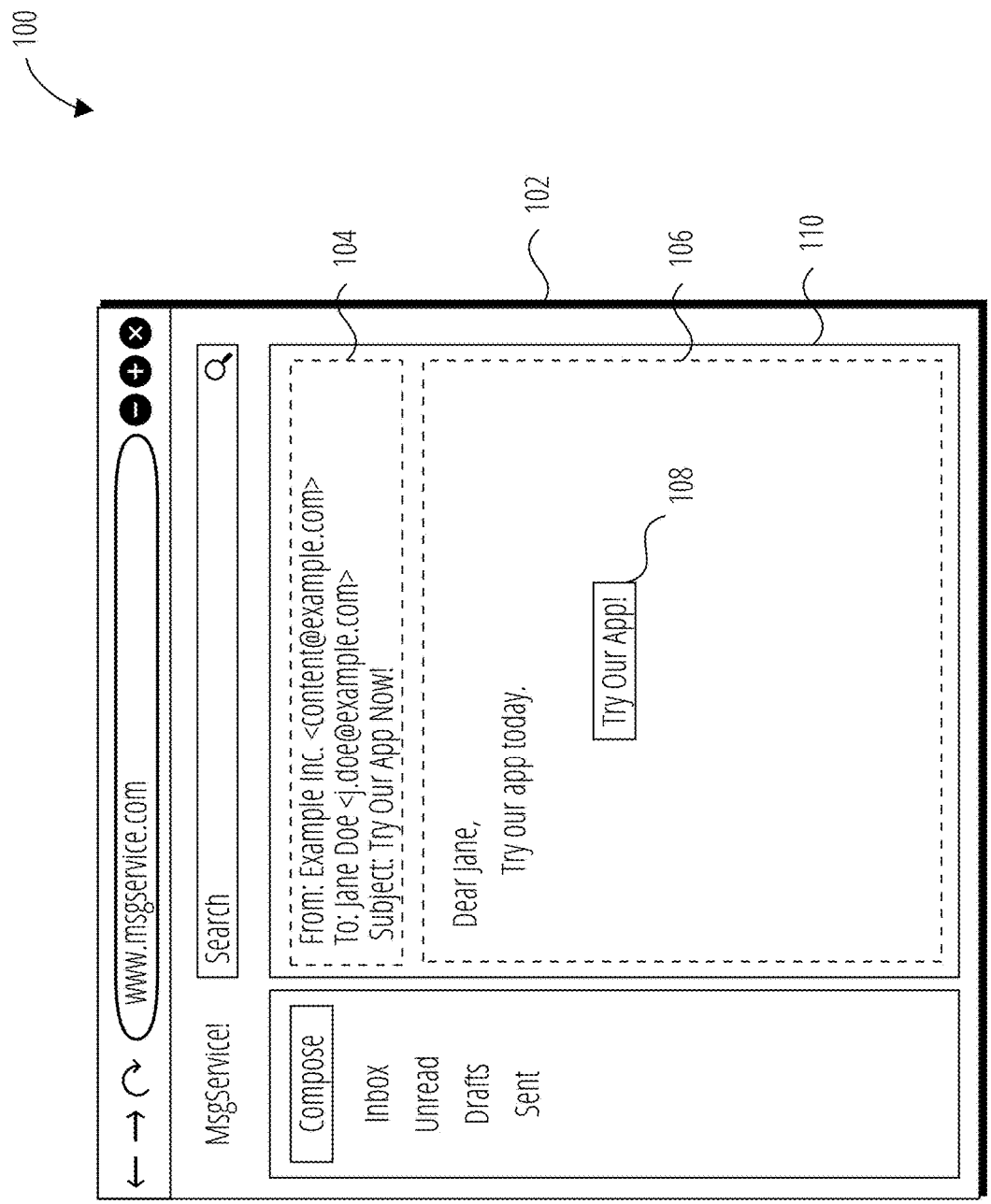
FIG. 1A is a block diagram of a message display interface (MDI) for displaying interactive content items.
Figure 1B:
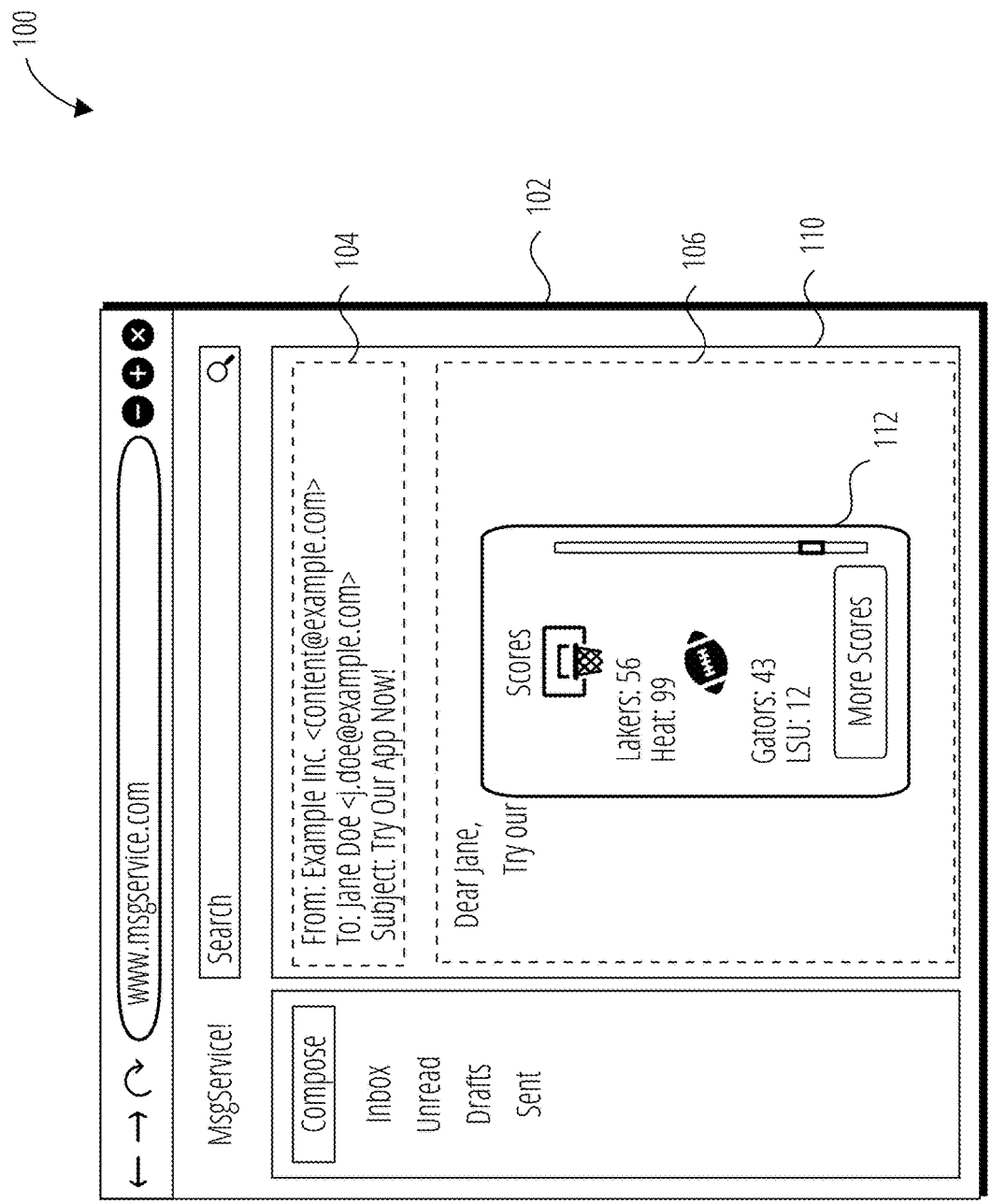
FIG. 1B is another block diagram of the MDI 100 of FIG. 1A displaying an interactive content item.

FIG. 1A and FIG. 1B are block diagram of a message display interface (MDI) 100 for rendering and displaying interactive content items.

According to some embodiments, the MDI 100 can display a message including message data. In some embodiments, MDI 100 can receive inputs from a user in relation to the message data. In some embodiments, the message data can include, for example, a header 104 and a body 106. According to some embodiments, the message can take various forms, including electronic mail (email), text messages, chat messages, in-app messages, or generally any other type of computer-based message. While in FIG. 1A and FIG. 1B, the MDI 100 is depicted as a web browser 102 the disclosure is not limited as such. In some embodiments, MDI 100 can be any system or application providing communications between two users using messages (e.g., a web based messaging service accessed through browser 102). In some embodiments, the MDI 100 can be a mobile application.

According to some embodiments, header 104 can include various metadata fields related to the message data. In some embodiments, as illustrated, header 104 can include a sender name ("Example Inc.") or address ("info@example.com"), a recipient name ("Jane Doe") or address ("j.doe@example.com"), and a subject line ("Try our app now!"). In some embodiments, header 104 can include various other fields (e.g., send date, attachment list, etc.), and the disclosure is not limited to only those fields depicted.

In some embodiments, the message data can include a body 106 portion that includes one or more message content items. In some embodiments, the message content items can include text, audio, video, image content, or equivalent types of content items. For example, in some embodiments, body 106 can be a Hypertext Markup Language (HTML) document. As illustrated, in some embodiments, body 106 can include various content items such as text content or hyperlink 108.

In addition to message data, MDI 100 can also generate, render, and/or display interactive content 112. As illustrated in FIG. 1B, the message data (e.g., header 104 and body 106) and interactive content 112 can be displayed in pane 110. In some embodiments, interactive content 112 can be displayed anywhere in MDI 100. Still, the disclosure is not limited to a specific type of arrangement. In some embodiments, MDI 100 can generate, render, and/or display interactive content 112 in relation to a user interaction with a hyperlink 108. In some embodiments, MDI 100 can generate, render, and/or display interactive content 112 based on interactive content data.

In some embodiments, interactive content 112 can be generated using WebAsembly (WASM) instructions or code. In some embodiments, interactive content 112 can be generated using Javascript instructions or code. In some embodiments, interactive content 112 can be generated using any portable binary instruction format. In some embodiments, MDI 100 can be implemented using a stack-based virtual machine. In some of those embodiments, interactive content 112 can be generated using an instruction format for the stack-based virtual machine. In some embodiments, interactive content 112 is generated based on interactive content data. In some embodiments, interactive content data can include instructions, code, and/or files that can be used by MDI 100 to generate, render, or display interactive content 112. In some embodiments, interactive content data can include one or more beacon Uniform Resource Locator (URL) to track a metric corresponding to the interactive content (e.g., viewability metrics and user interaction).

Interactive content 112 can take various forms. For example, in some embodiments, interactive content 112 can include one or more media (e.g., video, image, sound) content items. In some embodiments, interactive content 112 can include one or more hyperlinks. In some embodiments, interactive content 112 can be a website. In some embodiments, interactive content 112 can be an online store.

According to some embodiments, interactive content 112 can be a representation or copy of a mobile application. In some embodiments, interactive content 112 can be a representation or copy of a full computer application or program. In some embodiments, interactive content 112 can be a representation or copy of a computer game. In some embodiments, interactive content 112 can be a version of a full computer application or program with limited functionality. For example, in an embodiment where interactive content 112 is a representation of a computer game, interactive content 112 can have all the functionality of the full computer game but be limited to a few levels of the game. In another example embodiment, where the interactive content 112 is a version of a financial mobile application, interactive content 112 can display the same pages and data as the full mobile application but limit a search functionality or the types of graphs shown. FIG. 1B illustrates an example embodiment where the interactive content 112 is a copy or version of a mobile application that reports sport scores.

Figure 2:
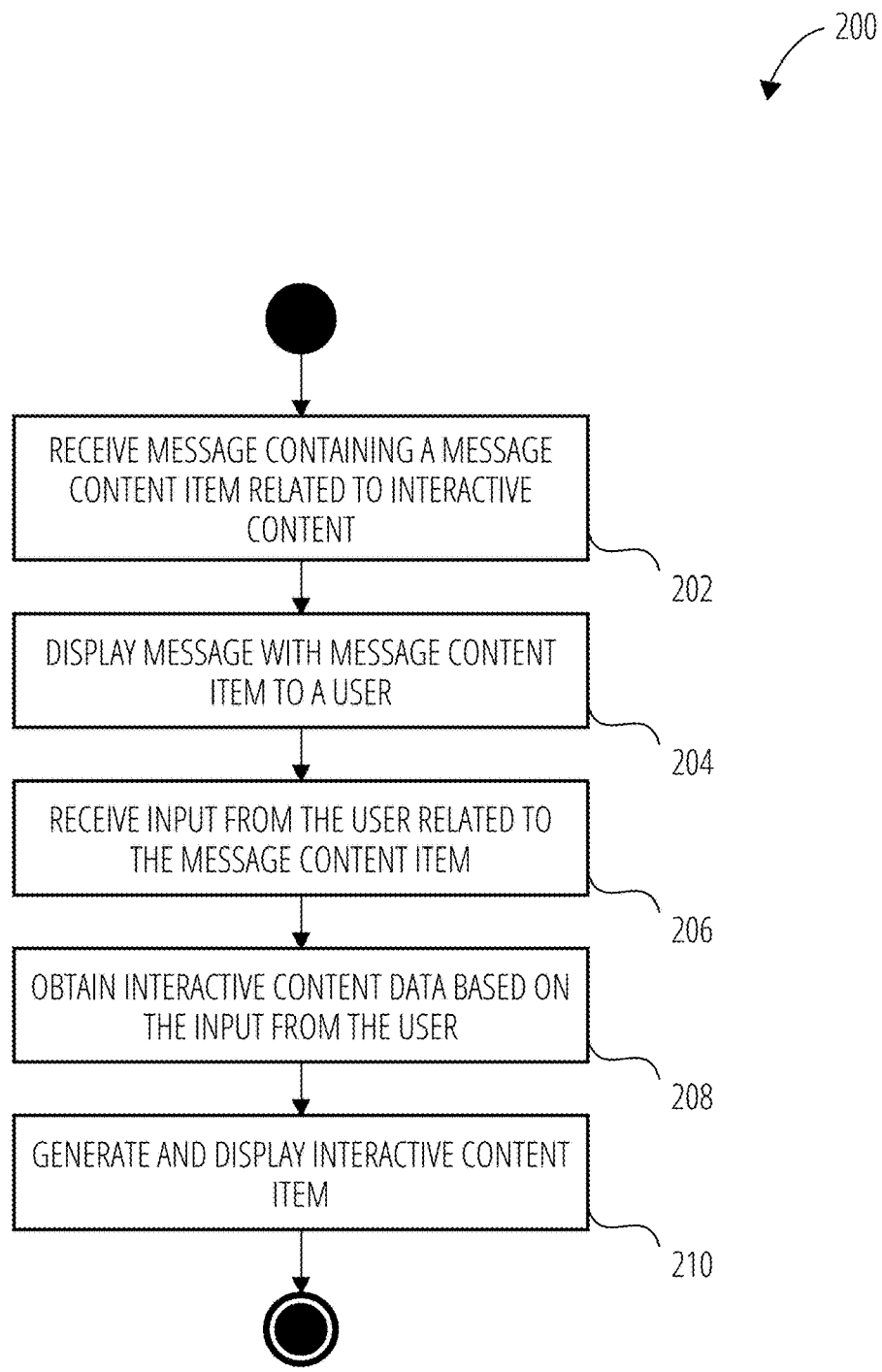
FIG. 2 is a flow diagram illustrating a method for generating and displaying interactive content by a messaging interface according to some embodiments.

FIG. 2 is a flow diagram illustrating a method for generating and displaying interactive content into a messaging interface according to some embodiments.

In Step 202, method 200 can include receiving a message. As discussed above, a message can be an email, text message, in-app message, chat message, instant message, social network message or generally any other type of message. In some embodiments, the message can include message content items and/or message data as well as metadata (e.g., header data). In some embodiments, the message content items can include text, images, or videos. In some embodiments, method 200 can receive the message as part of receiving messages generally to implement a message service. In some embodiments, method 200 can receive a message in response to a request either by a user (e.g., a client device requesting to view a message) or automatically requested by a device. In either scenario, a sender may send and the user may receive the message.

According to some embodiments, the message can include one or more message content items related to interactive content. In some embodiments, the message content item can be a hyperlink corresponding to a web page or web service hosting interactive content. In some embodiments, the message can be received from a messaging server (e.g., messaging server 422).

In Step 204, method 200 can include displaying the message to the user through a User Interface (UI). For example, in some embodiments, the UI can be MDI 100 discussed in relation to FIGS. 1A and 1B. In some embodiments, the UI can be a mobile application implemented on a mobile device. In some embodiments, the UI can be a web browser and the message is displayed through a web page of a messaging service. In some embodiments, in Step 204, the message can be displayed through a display module of a device (e.g., Device 500).

In Step 206, method 200 can include receiving an input corresponding to an interaction between the user and the message content item through the UI. In some embodiments, the input can be received through a peripheral of the device (e.g., Peripheral devices 512 of Device 500). In some embodiments, the input represents an instruction to the device to generate or render the interactive content. In some embodiments, the input represents an instruction to the device to display the interactive content. In some embodiments, the input can include the user clicking a hyperlink in the message.

In Step 208, method 200 can include obtaining interactive content data corresponding to the interactive content. In some embodiments, interactive content data can include instructions, code, text, images, audio, videos, and any other type of data used in the generation or rendering of interactive content. In some embodiments, the interactive content data can include WASM instructions. In some embodiments, the interactive content data can include instructions in any programming language (e.g., Javascript, HTML, C++, C #, Python, Rust, Go, and the like). In some embodiments, the interactive content data can include different sets of instructions in different programming languages.

In some embodiments, obtaining the interactive content data can include transmitting a request to provide the interactive content data to a third party (e.g., content server 414) and receiving the interactive content data from the third part. In some embodiments, the third party can implement a bidding process whereby a plurality of content creators bid to provide interactive content and the provided interactive content data corresponds to the winner of the bidding process.

In some embodiments, obtaining the interactive content data can include retrieving at least a portion of the interactive content data from a local database or cache. In some embodiments, obtaining the interactive content data can include retrieving a portion of the interactive content data from a local database or cache and retrieving the rest of the interactive content from the third party. In some embodiments, at least a portion of the interactive content data can be embedded in the message or attached as one or more files to the message. In some embodiments, at least a portion of the interactive content data is stored locally or on a server as part of the UI.

In Step 210, method 200 can include generating and/or rendering the interactive content based on the interactive content data. In some embodiments, generating the interactive content can include implementing a stack-based virtual machine and using the virtual machine as a compilation target for at least a portion of the interactive content data. In some embodiments, generating the interactive content can include generating an executable by compiling at least a portion of the interactive content data at the device. In some embodiments, at least a portion of the interactive content data can include an executable and Step 210 can include rendering the interactive content at least in part by running the executable. In some embodiments, the UI can include or otherwise communicate with an interactive content engine to generate or render the interactive content based on the interactive content data. For example, in an embodiment where the UI is a web page in a web browser, generating and/or rendering the interactive content includes compiling and/or executing at least a portion of the interactive content by the web browser. As another example, in an embodiment where the UI is a mobile application, generating and/or rendering the interactive content includes compiling and/or executing at least a portion of the interactive content by a mobile device.

In Step 210, method 200 can also include displaying the interactive content to the user through the UI. In some embodiments, displaying the interactive content to the user can be part of generating or rendering the interactive content. According to some embodiments, the interactive content can be displayed in a plurality of ways depending on the UI implementation. For example, in embodiments where the UI includes a web browser, the interactive content can be rendered within the web browser and superimposed to the web page but be independent of the web page. As another example, in embodiments where the UI is a mobile application, the interactive content can be rendered within the mobile application and superimposed to the content of the mobile application. In some embodiments, the interactive content can be thought as an application generated by another application and displayed as part of the other application but be independent in its functionality from the other application.

Figure 3:
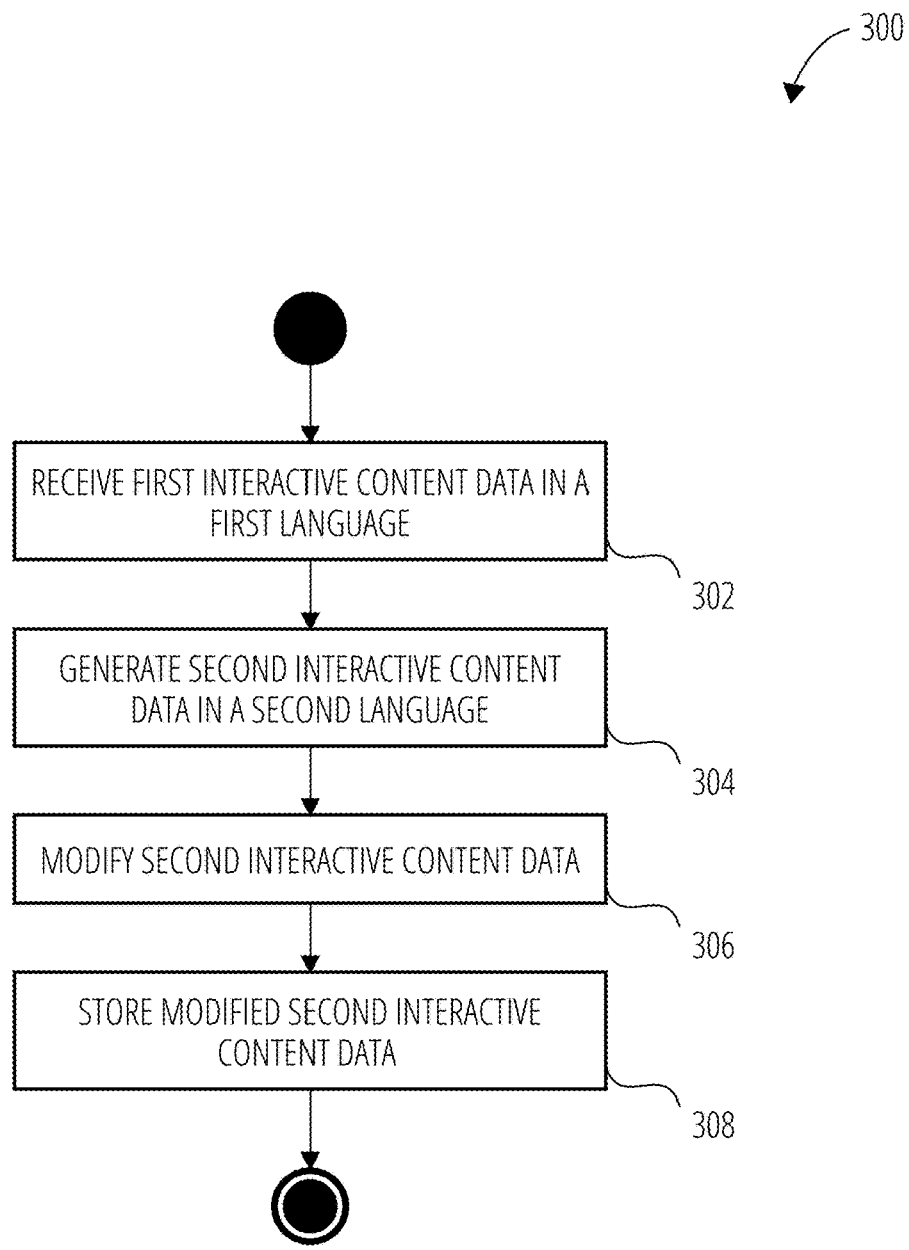
FIG. 3 is a flow diagram illustrating a method for generating interactive content data corresponding to interactive content according to some embodiments.

FIG. 3 is a flow diagram illustrating a method for generating interactive content data corresponding to interactive content according to some embodiments.

In Step 302, method 300 can include receiving first interactive content data from a content provider. In some embodiments, a content provider can be the publisher or creator of a mobile application, a mobile game, or advertisement creator. In some embodiments, the first interactive content data corresponds to a full functionality version of a program or application. In some embodiments, at least a portion of the first interactive content data includes instructions or code representing the program or application in a first language. For example, in some embodiments, the first language can be C, C++, C #, Python, Rust, and Go.

In Step 304, method 300 can include generating a second interactive content data based on the first interactive content data. In some embodiments, generating the second interactive content data can include, at least in part, compiling at least a portion of the first interactive content data. In some embodiments, the second interactive content data can include instructions or code in a second language. In some embodiments, the second language can be a portable binary code such as WASM. In some embodiments, the second language can be any portable code. In some embodiments, the second interactive content can have all the functionality of the first interactive content. In some embodiments, the generated second interactive content data can include portable binary code and associated files (e.g., Javascript, Cascading Style Sheets (CSS), or HTML files).

Optionally, in Step 306, method 300 can include modifying the second interactive content data so that the second interactive content is partially different from the first interactive content. In some embodiments, modifying the second interactive content data can include removing or otherwise limiting functionality of the second interactive content whereby the second interactive content has less functionality than the first interactive content. While optional Step 306, is performed with respect to the second interactive content, in some embodiments, Step 306 can be performed with respect to the first interactive content data instead of the second interactive content data. In those embodiments, the first interactive content data can be modified prior to Step 304 whereby the second interactive content data represents a second interactive content that is partially different from the first interactive content. In some of those embodiments, the second interactive content may not have the same functionality or may have limited functionality when compared to the first interactive content.

In Step 308, method 300 can include storing the second interactive content data in a database. In some embodiments, the database can be a content database of a third party. In some embodiments, the database can be a local database of a device.

Figure 4:
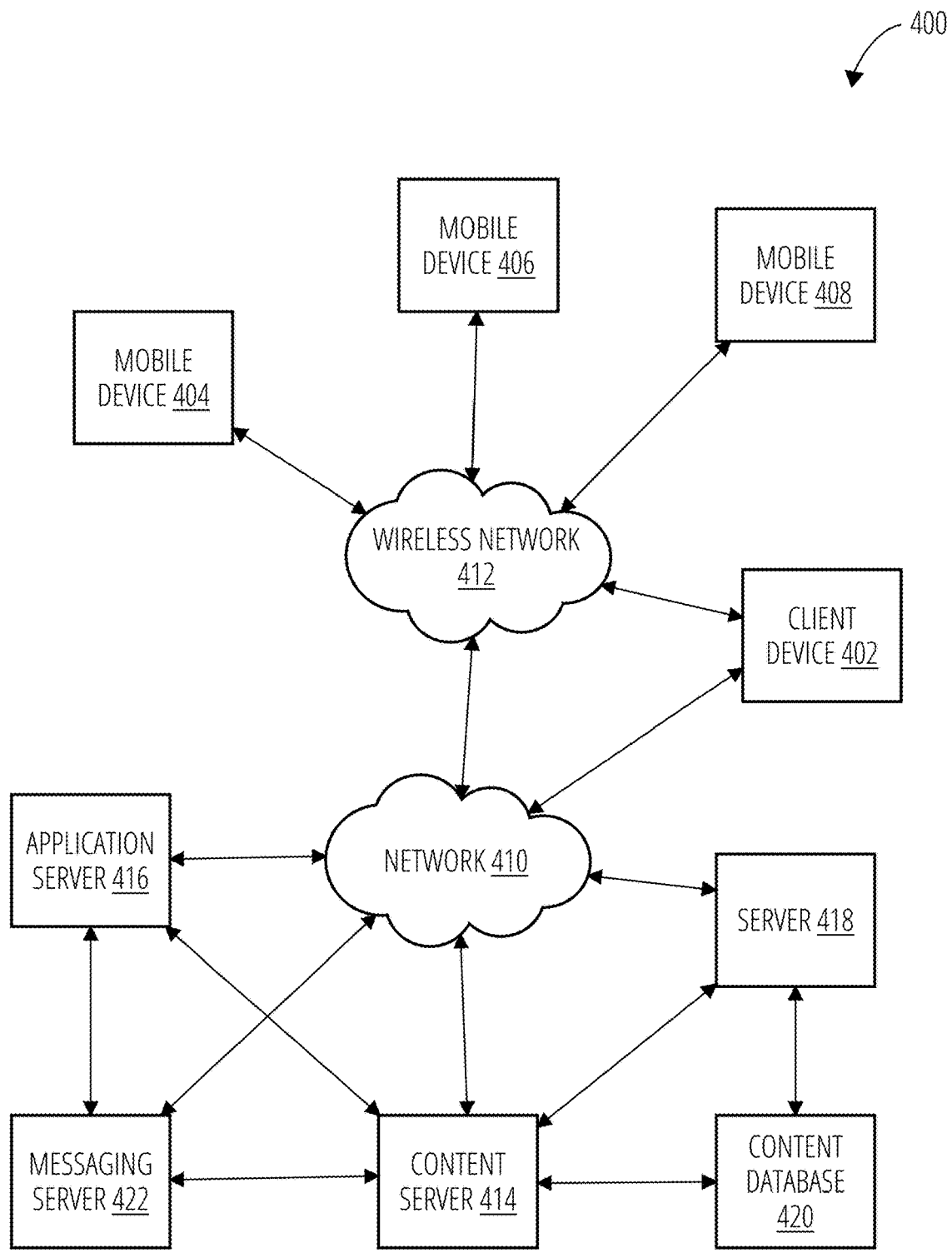
FIG. 4 is a block diagram illustrating an example environment within which the systems and methods disclosed herein could be implemented according to some embodiments.

FIG. 4 is a block diagram illustrating an example environment within which the systems and methods disclosed herein could be implemented according to some embodiments.

Not all the components may be required to practice the disclosure, and variations in the arrangement and type of the components may be made without departing from the spirit or scope of the disclosure.

FIG. 4 illustrates a system 400 in accordance with an embodiment of the present disclosure According to some embodiments, system 400 can include local area networks ("LANs")/wide area networks ("WANs")—network 410, wireless network 412, mobile devices (client device) 404-408 and client device 402. System 400 can also include a variety of servers, such as content server 414, application ("App") server 416, and third party servers 418.

One embodiment of mobile devices 404-408 is described in more detail below. Generally, however, mobile devices 404-408 can include virtually any portable computing device capable of receiving and sending a message over a network, such as network 410, wireless network 412, or the like. In some embodiments, mobile devices 404-408 can also be described generally as client devices that are configured to be portable.

Mobile devices 404-408 can also include at least one client application that is configured to receive content from another computing device. In some embodiments, the client application can include a capability to provide and receive textual content, graphical content, audio content, and the like. In some embodiments, the client application can further provide information that identifies itself, including a type, capability, name, and the like. In one embodiment, mobile devices 404-408 may uniquely identify themselves through any of a variety of mechanisms, including a phone number, Mobile Identification Number (MIN), an electronic serial number (ESN), or other mobile device identifier.

In some embodiments, mobile devices 404-408 can also communicate with non-mobile client devices, such as client device 402, or the like. In some embodiments, client device 402 may include virtually any computing device capable of communicating over a network to send and receive information.

In some embodiments, devices 402-408 can be referred to as computing devices. Devices 402-408 may be capable of sending or receiving signals, such as via a wired or wireless network, or may be capable of processing or storing signals, such as in memory as physical memory states, and may, therefore, operate as a server. Computing devices may, for example, include portable, non-portable, and wearable devices (e.g., desktop computers, cellular phones, smart watches, and tablets).

Wireless network 412 can be configured to couple mobile devices 404-408 and its components with network 410. Wireless network 412 can include any of a variety of wireless sub-networks that may further overlay stand-alone ad-hoc networks, and the like, to provide an infrastructure-oriented connection for mobile devices 404-408. Such sub networks can include mesh networks, Wireless LAN (WLAN) networks, cellular networks, and the like. In some embodiments, a wireless network may include virtually any type of wireless communication mechanism by which signals may be communicated between computing devices.

Network 410 is configured to couple content server 414, App server 416, or the like, with other computing devices, including, client device 402, and through wireless network 412 to mobile devices 404-408. Network 410 is enabled to employ any form of computer readable media or network for communicating information from one electronic device to another. Also, network 410 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine readable media, for example.

In some embodiments, the disclosed networks 410 and/or 412 can comprise a content distribution network(s). A "content delivery network" or "content distribution network" (CDN) generally refers to a distributed content delivery system that comprises a collection of computers or computing devices linked by a network or networks.

In some embodiments, the content server 414 can include a device that includes a configuration to provide any type or form of content via a network to another device. Content server 414 can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for can be provided via the App server 416, whereby a user is able to utilize such service upon the user being authenticated, verified or identified by the service. In some embodiments, content server 414, App server 416, and third-party server 418 can store, obtain, retrieve, or provide interactive content and/or interactive content data as discussed herein.

Servers 414, 416, and 418 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 414, 416, and/or 418 via the network 410 and/or wireless network 412 using their various devices 402-408.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 416, content server 414, and the like.

Thus, the App server 416, for example, can store various types of applications and application related information including application data and user profile information (e.g., identifying and behavioral information associated with a user). It should also be understood that content server 414 can also store various types of data related to the content and services provided by content server 414 in an associated content database 420, as discussed in more detail below.

Third party server 418 (in some embodiments, an "ad server") can comprise a server that stores online advertisements for presentation to users. "Ad serving" refers to methods used to place online advertisements on websites, in applications, or other places where users are more likely to see them, such as during an online session or during computing platform use, for example. In some embodiments, Server 418 can incorporate near instantaneous auctions of ad placement opportunities during web page creation.

Moreover, although FIG. 4 illustrates servers 414, 416, and 418 as single computing devices, respectively, the disclosure is not so limited. For example, one or more functions of servers 414, 416, and/or 418 can be distributed across one or more distinct computing devices. Moreover, in one embodiment, servers 414, 416, and/or 418 can be integrated into a single computing device, without departing from the scope of the present disclosure.

Figure 5:
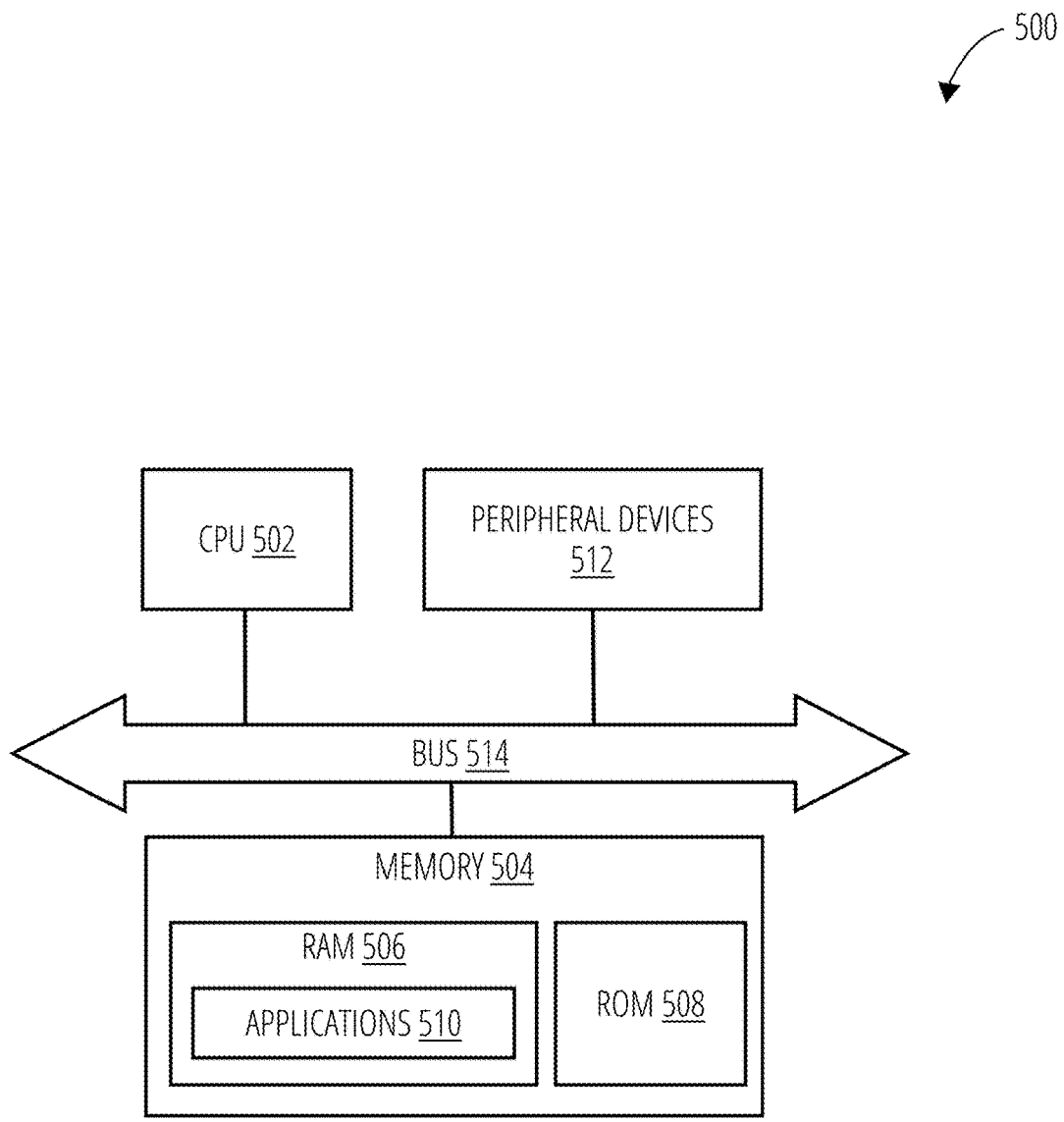
FIG. 5 is a block diagram of a device according to some embodiments.

FIG. 5 is a block diagram of a device according to some embodiments.

As illustrated, the device 500 can include a processor or central processing unit (CPU) such as CPU 502 in communication with a memory 504 via a bus 514. The device can also include one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 can comprise a general-purpose CPU. The CPU 502 can comprise a single-core or multiple-core CPU. The CPU 502 can comprise a system-on-a-chip (SoC) or a similar embedded system. In some embodiments, a graphics processing unit (GPU) can be used in place of, or in combination with, a CPU 502. Memory 504 can comprise a non-transitory memory system including a dynamic random-access memory (DRAM), static random-access memory (SRAM), Flash (e.g., NAND Flash), or combinations thereof. In one embodiment, the bus 514 can comprise a Peripheral Component Interconnect Express (PCIe) bus. In some embodiments, bus 514 can comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device 500 can optionally communicate with a base station (not shown) or directly with another computing device. One or more network interfaces in peripheral devices 512 are sometimes referred to as a transceiver, transceiving device, or network interface card (NIC).

An audio interface in Peripheral devices 512 produces and receives audio signals such as the sound of a human voice. For example, an audio interface may be coupled to a speaker and microphone (not shown) to enable telecommunication with others or generate an audio acknowledgment for some action. Displays in Peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 can comprise any input device arranged to receive input from a user. An illuminator in peripheral devices 512 can provide a status indication or provide light. The device can also comprise an input/output interface in peripheral devices 512 for communication with external devices, using communication technologies, such as USB, infrared, Bluetooth™, or the like. A haptic interface in peripheral devices 512 can provide a tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a processor, a message sent by a sender to a user, the message including a message content item related to an item of interactive content, wherein the interactive content is a modified version of a mobile application;
   displaying, by the processor, the message to the user through a user interface (UI);
   receiving, by the processor, an input corresponding to an interaction between the user and the message content item in the UI, the input directing the processor to generate the interactive content;
   obtaining, by the processor, interactive content data related to the interactive content;

generating, by the processor, the interactive content based on the interactive content data; and displaying, by the processor, the generated interactive content to the user through the UI.

2. The method of claim 1, wherein the message is an email and the message content item includes a hyperlink.

3. The method of claim 1, wherein the interactive content data includes WebAssembly (WASM) instructions.

4. The method of claim 1, wherein the mobile application has a related application content data in a first language, wherein the interactive content data of the interactive content is in a second language, and wherein the interactive content data is generated by modifying the application content data.

5. The method of claim 1, wherein the UI is a web browser.

6. The method of claim 1, wherein the interactive content data is obtained from a third party.

7. A non-transitory computer-readable storage medium, the computer-readable storage medium including instructions that when executed by a computing device, cause the device to:

receive a message sent by a sender to a user, the message including a message content item related to an item of interactive content, wherein the interactive content is a modified version of a mobile application;

display the message to the user through a user interface (UI);

receive an input corresponding to an interaction between the user and the message content item in the UI, the input directing the device to generate the interactive content;

obtain interactive content data related to the interactive content;

generate the interactive content based on the interactive content data; and display the generated interactive content to the user through the UI.

8. The computer-readable storage medium of claim 7, wherein the message is an email and the message content item includes a hyperlink.

9. The computer-readable storage medium of claim 7, wherein the interactive content data includes WebAssembly instructions.

10. The computer-readable storage medium of claim 7, wherein the mobile application has a related application content data in a first language, wherein the interactive content data of the interactive content is in a second language, and wherein the interactive content data is generated by modifying the application content data.

11. The computer-readable storage medium of claim 7, wherein the UI is a web browser.

12. The computer-readable storage medium of claim 7, wherein the interactive content data is obtained from a third party.

13. A device comprising:

a processor configured to:

receive a message sent by a sender to a user, the message including a message content item related to an item of interactive content, wherein the interactive content is a modified version of a mobile application;

display the message to the user through a user interface (UI);

receive an input corresponding to an interaction between the user and the message content item in the UI, the input directing the processor to generate the interactive content;

obtain interactive content data related to the interactive content;

generate the interactive content based on the interactive content data; and display the generated interactive content to the user through the UI.

14. The device of claim 13, wherein the message is an email and the message content item includes a hyperlink.

15. The device of claim 13, wherein the interactive content data includes WebAssembly instructions.

16. The device of claim 13, wherein the mobile application has a related application content data in a first language, wherein the interactive content data of the interactive content is in a second language, and wherein the interactive content data is generated by modifying the application content data.

17. The device of claim 13, wherein the interactive content data is obtained from a third party.

* * * * *